United States Patent

[11] 3,633,243

[72] Inventors: Anton Dietrich;
Alois Wagner, both of Munich; Paul Stutz, Alten-Erding; Martin Obster, Hohenbrunn-Riemeling, all of Germany
[21] Appl. No.: 30,686
[22] Filed: Apr. 22, 1970
[45] Patented: Jan. 11, 1972
[73] Assignee: Optische Werke G. Rodenstock Munich, Germany
[32] Priority: June 26, 1969
[33] Germany
[31] G 69 25 299.9

[54] SPECTACLE FRAME
9 Claims, 4 Drawing Figs.
[52] U.S. Cl. ............................................. 16/128 A, 351/153
[51] Int. Cl. ............................................. G02c 5/22
[50] Field of Search ........................ 351/146–149, 153; 16/150, 128 A, 159

[56] References Cited
UNITED STATES PATENTS

| 3,489,490 | 1/1970 | Seaver | 351/153 |
| 1,643,218 | 9/1927 | McDonell | 351/153 |
| 3,192,556 | 7/1965 | Himelreich | 16/150 |

FOREIGN PATENTS

| 463,491 | 1937 | Great Britain | 351/153 |
| 974,380 | 1964 | Great Britain | 351/153 |
| 339,396 | 1959 | Switzerland | 351/153 |

Primary Examiner—Donald A. Griffin
Attorney—Kelman and Berman

ABSTRACT: The temple pieces of a spectacle frame are secured to lens rims of thermoplastic synthetic resin composition by a hinge assembly of which one element is partly embedded in the associated rim. It is a unitary metal piece having a baseplate portion from which an eye or barrel projects. The embedded portion consists of two transversely spaced barbed pins of partly rounded trapezoidal cross section which are inserted into blind, round bores of the rim while heated well above the softening temperature of the resin composition.

PATENTED JAN 11 1972 3,633,243

SPECTACLE FRAME

This invention relates to spectacle frames, and particularly to the hinges which attach the temple pieces to the lens rims. In its more specific aspects, the invention is concerned with spectacle frames having lens rims of thermoplastic synthetic resin composition and to hinge elements suitable for being fastened to such rims by embedding.

It is known partly to embed hinge elements in the thermoplastic spectacle frame parts by inserting the hot hinge elements in a suitably shaped opening so that the plastic material flows about the inserted part for fastening the same when the plastic cools. The known devices are limited in their application and not always satisfactory.

Some of the known devices require the plastic body to be formed with openings of a shape not readily achieved in a simple manner, such as an elongated slot. Others consist of several parts of which some are individually fastened to the plastic or resin composition whereafter others are attached to the fastened parts. Yet others cannot be securely anchored in a lens rim unless the latter is unusually heavy or provided with special lugs, and many of the known hinge elements are not fastened securely enough to prevent relative movement of the hinge element and the associated lens rim.

An object of the invention is the provision of a lens frame of the type described in which the temple pieces are secured safely to the lens rims in a simple manner and without requiring an especially heavy configuration of the latter.

With this object and others in view, as will presently become apparent, the invention provides a unitary hinge element including a plate portion having two opposite major faces. An apertured eye portion of the element projects from one of the plate faces and two barbed pin portions from the other face. The pin portions are each elongated in a common direction away from the other face.

The free longitudinal end parts of the two pin portions are transversely spaced from each other so as to define therebetween a slot in the hinge element. The cross section of each free end part over substantially the entire length thereof has the approximate shape of a trapezoid, the larger bases of the trapezoids facing each other across the slot.

A first longitudinal section of each free end part tapers toward the plate portion, and a second longitudinal section tapers away from the first section and the plate portion, the apex angle of the first section being greater than that of the second portion. A third and fourth section similarly tapering are preferably provided for better anchorage of the hinge element in plastic frame parts.

When inserted into the lens rim under suitable conditions of temperature and pressure, the pin portions are conformingly embedded in the synthetic resin composition of the associated lens rim, and the eye portion projects from the lens rim so that it may be linked by a pivot pin to a corresponding hinge element on the temple piece.

Other features and many of the attendant advantages of this invention will readily become apparent from the following detailed description of a preferred embodiment of the invention when considered in connection with the appended drawing in which.

Figure 1:
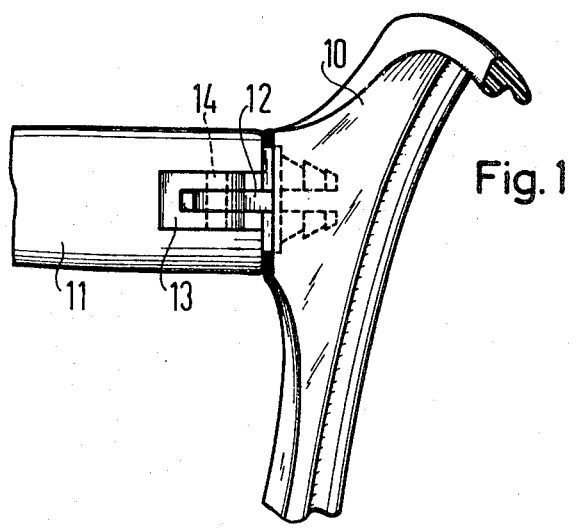
FIG. 1 shows a spectacle frame of the invention in a fragmentary perspective view.

Referring now to the drawing, and initially to FIG. 1, there is shown as much of an otherwise conventional, symmetrical spectacle frame as is needed for an understanding of this invention. The frame includes two lens rims 10 of thermoplastic synthetic resin composition, of which only one is partly illustrated, and which are connected by a nonillustrated bridge or nosepiece which may also be of plastic or of metal. Each lens rim 10 is pivotally secured to an associated temple piece 11 by a hinge assembly including two apertured element 12, 13 and a pin 14 simultaneously received in the aligned apertures of the elements 12, 13 which are partly embedded respectively in the lens rim 10 and the temple piece 11.

Figure 2:
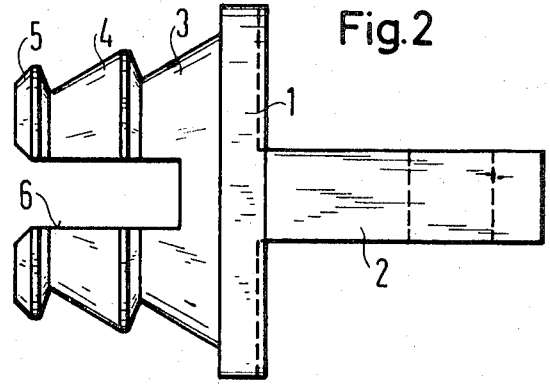
FIG. 2 illustrates a hinge element of the frame of FIG. 1 in side elevation on a larger scale.
Figure 3:
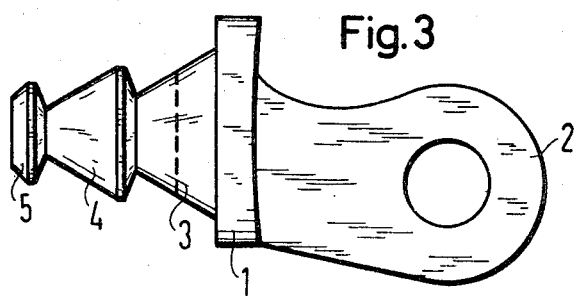

The hinge element 13 may be of a conventional type and has two aligned eyes or barrels. The element 12 is shown on a larger scale and in more detail in FIGS. 2 to 4.

It is a unitary rigid piece of metal, such as brass which may be plated with nickel and/or gold. It consists mainly of a base plate 1, a barrel or eye portion 2, and two barbed pins, the eye portion 2 and the pins projecting from opposite major faces of the base plate 1. The face of the plate 1 from which the eye portion 2 projects is cylindrically concave approximately about the axis of the eye in the portion 2 to facilitate pivotal movement of the temple piece 11, not itself seen in FIGS. 2 to 4.

Figure 4:
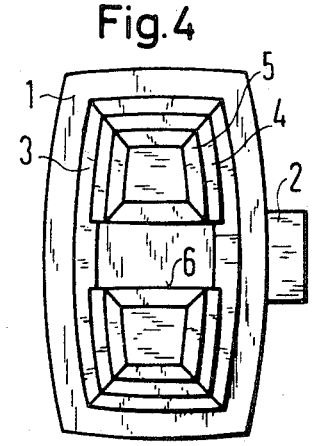
FIGS. 3 and 4, respectively, show the device of FIG. 2 in plan view and front elevation.

The parts 3 of the barbed pins nearest the plate 1 are integrally joined, and have the cross-sectional shape of an elongated rectangle whose sides bulge outwardly, as best seen in FIG. 4. The free end parts of the two pins are separated by a slot 6 having flat opposite walls and each consist of several longitudinal sections alternatingly tapering toward the plate 1 and away from the plate 1, the apex angles of the tapers toward the plate 1 being much greater than those of the tapers directed away from the plate 1.

The pins are thereby formed with two barbs 4, 5 which facilitate insertion of each pin into a bore in the lens rim 10 during assembly of the frame, but resist withdrawal. Although the cross section of each pin varies over its length, each cross section of the free end part has the approximate shape of a trapezoid whose sides and shorter bases arcuately bulge in an outward direction. The longer bases which bound the slot 6 are straight and aligned in the direction of pin elongation. The outermost longitudinal section of the barb 5 is beveled all around.

The hinge element is readily produced on automatic metalworking equipment at low cost. It is assembled hot with a thermoplastic lens rim in which two round, blind holes were drilled prior to assembly and can be inserted into the holes with little pressure. When embedded in the cooled plastic, the barbed pins resist all attempts at moving them relative to the lens rim, and it is not normally possible to remove or even loosen the hinge element without breaking the lens rim unless the latter should be of unusually heavy section.

The illustrated hinge element can be embedded successfully in very slim lens rims as is partly evident from FIG. 1. The pins when embedded in transparent or translucent, plastic contribute their own decorative effect to the spectacle frame. The slight convex curvature of the exposed pin surfaces causes light to be reflected in a pleasing manner. The curved surfaces also contribute greatly to the ease with which the hinge element can be embedded in the plastic without leaving voids as is more likely with planar surfaces.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A unitary rigid hinge element for use in a spectacle frame comprising:
   a. a plate portion having two opposite major faces;
   b. an apertured eye portion projecting from one of said faces;
   c. two barbed pin portions projecting from the other face of said plate portion and being each elongated in a common direction away from said other face,
      1. the free longitudinal end parts of said pin portions remote from said other face being tranversely spaced so as to define therebetween a slot in said hinge element,
      2. the cross section of each of said free end parts having the approximate shape of a trapezoid, the larger bases of said trapezoids facing each other across said slot, and 3. a first longitudinal section of each of said free parts tapering toward said other face, and a second longitudinal section of said free part tapering away from said first section and from said other face.

2. An element as set forth in claim 1, wherein said first section tapers at a greater apex angle than said second section.

3. An element as set forth in claim 2, wherein each of said free parts has a third longitudinal section tapering toward said first and second sections and toward said other face, and a fourth longitudinal section tapering away from said third section and said other face, said third section tapering at a greater apex angle than said fourth section.

4. An element as set forth in claim 3, wherein said pin portions have respective spacedly parallel, flat, wall portions bounding said gap.

5. An element as set forth in claim 3, wherein the larger bases of the trapezoids defined by a plurality of said longitudinal sections in each of said free parts are aligned in a common plane extending in said common direction.

6. An element as set forth in claim 3, wherein said first, second, third, and fourth longitudinal sections are longitudinally consecutive in this order and contiguous.

7. A spectacle frame comprising, in combination:
  a. two fixedly connected lens rims of thermoplastic synthetic resin composition;
  b. two temple pieces; and
  c. two hinge assemblies respectively connecting said temple pieces to said lens rims, each hinge assembly including
   1. a first hinge element as set forth in claim 2, said pin portions being conformingly embedded in the synthetic resin composition of the associated lens rim, and said eye portion projecting from said associated lens rim,
   a second apertured hinge element fastened to the associated temple piece, and
   3. a hinge pin simultaneously received in the apertures of said hinge elements.

8. A spectacle frame as set forth in claim 7, wherein each lens frame is annular about a central axis, and said pin portions are elongated substantially tangentially relative to a circle about said axis.

9. An element as set forth in claim 2 which is a unitary body of metal.

* * * * *